United States Patent
Tsuboi et al.

(10) Patent No.: US 7,072,978 B2
(45) Date of Patent: Jul. 4, 2006

(54) SUBSCRIBER TERMINATING APPARATUS AND PACKET PROCESSING METHOD

(75) Inventors: Tetsuya Tsuboi, Kawasaki (JP); Kiyoshi Sukegawa, Kawasaki (JP); Yasuhiro Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 606 days.

(21) Appl. No.: 09/969,963

(22) Filed: Oct. 2, 2001

(65) Prior Publication Data

US 2002/0138646 A1 Sep. 26, 2002

(30) Foreign Application Priority Data

Mar. 26, 2001 (JP) ............................. 2001-087283

(51) Int. Cl.
G06F 15/173 (2006.01)
G06F 15/16 (2006.01)

(52) U.S. Cl. ...................... 709/238; 709/239; 709/247

(58) Field of Classification Search ................ 709/224, 709/239; 370/401
See application file for complete search history.

(56) References Cited

U.S. PATENT DOCUMENTS

| | | | | |
|---|---|---|---|---|
| 5,544,162 A | * | 8/1996 | Mraz et al. ................ | 370/401 |
| 5,610,905 A | * | 3/1997 | Murthy et al. ............. | 370/401 |
| 5,867,666 A | * | 2/1999 | Harvey ...................... | 709/239 |
| 5,920,566 A | * | 7/1999 | Hendel et al. ............. | 370/401 |
| 6,256,314 B1 | * | 7/2001 | Rodrig et al. ............. | 370/401 |
| 6,279,035 B1 | * | 8/2001 | Brown et al. .............. | 709/224 |

FOREIGN PATENT DOCUMENTS

| JP | 07-143178 | 6/1995 |
|---|---|---|
| JP | 07-221783 | 8/1995 |

* cited by examiner

*Primary Examiner*—John Follansbee
*Assistant Examiner*—Kenny Lin
(74) *Attorney, Agent, or Firm*—Katten Muchin Rosenman LLP

(57) ABSTRACT

An IP datagram transmission technique in an ATM network. A DSU 1 comprises a selecting unit selecting a type of distribution representing distribution of a packet having a transmission source address to either bridging or routing, a bridging processor bridging the packet to generate a packet when bridging is selected, a routing processor routing the packet to generate a packet when routing is selected, and an ATM terminating unit encapsulating the packet to generate an ATM cell, thereby automatically discriminating between bridging and routing. Accordingly, the user can simultaneously connect to a plurality of Internet service providers to receive different service modes.

18 Claims, 14 Drawing Sheets

| TRANSMISSION SOURCE IP ADDRESS | VC NUMBER | TYPE OF DISTRIBUTION |
|---|---|---|
| 192.168.0.252 | VC1 | BRIDGING |
| 192.168.1.100 | VC2 | ROUTING |

| TAG NUMBER | TRANSMISSION SOURCE MAC ADDRESS | TRANSMISSION SOURCE IP ADDRESS | TYPE OF DISTRIBUTION | VC NUMBER |
|---|---|---|---|---|
| 1 | 00000E5F4EAF | 192.168.10.252 | BRIDGING | VC1 |
| 2 | 009027560476 | 192.168.1.100 | ROUTING | VC2 |
| ⋮ | ⋮ | ⋮ | ⋮ | ⋮ |
| 10 | 00000E5F4EAF | 192.168.10.252 | BRIDGING | VC2 |
| 11 | 00000E5F4EAF | 192.168.10.252 | ROUTING | VC1 |

| DESTINATION IP ADDRESS | SUBNET MASK | ROUTING DESTINATION PORT NUMBER |
|---|---|---|
| 192.168.10.0 | 255.255.255.0 | ETHER PORT 1 |
| 192.168.1.0 | 255.255.255.0 | ATM PORT 0 |

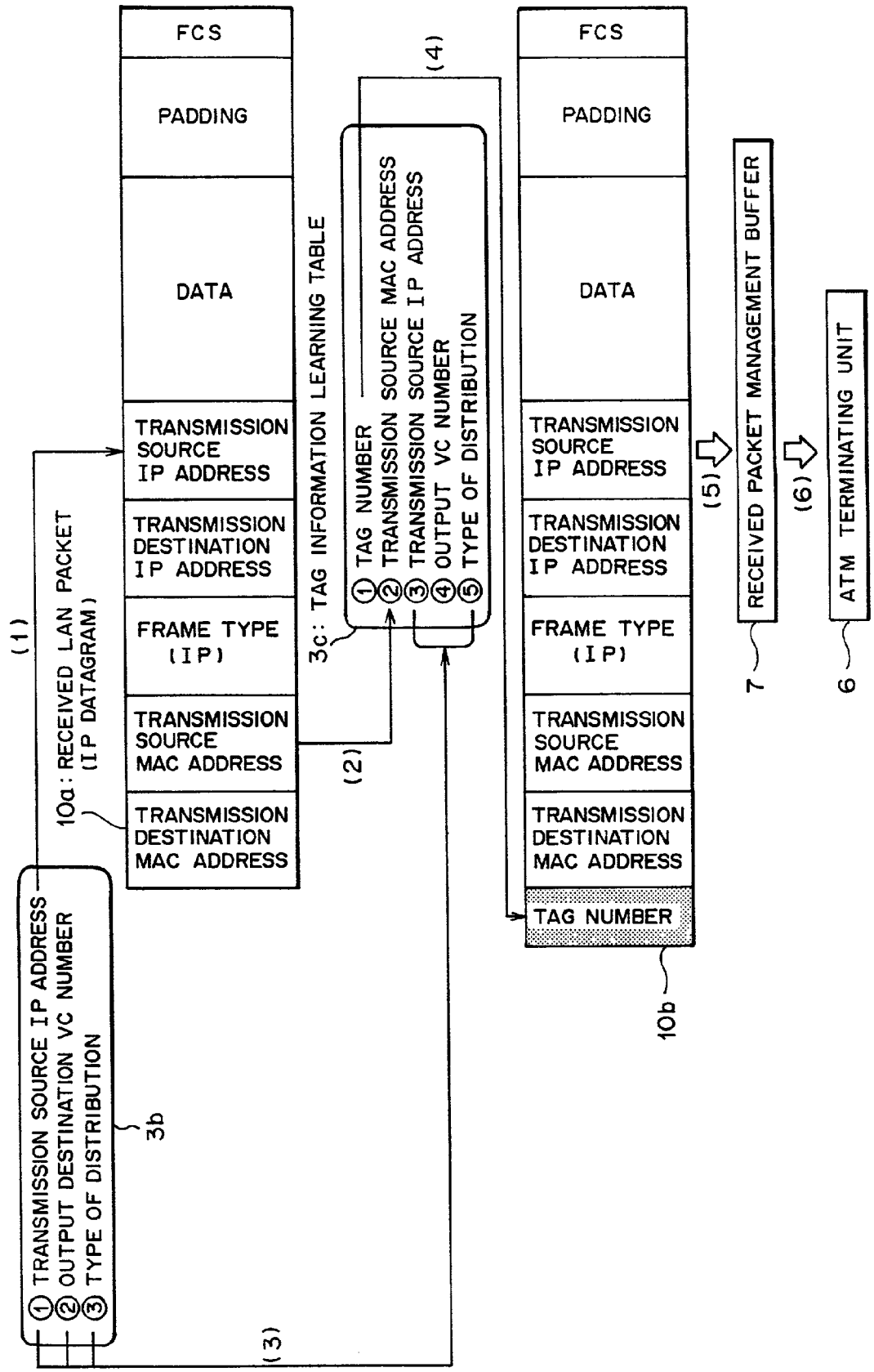

FIG. 8(a) IP DATAGRAM

| LLC HEADER | | | SNAP HEADER | | IP DATAGRAM (A MAXIMUM OF 1492 OCTETS IN CASE OF ETHERNET) |
|---|---|---|---|---|---|
| Dsap 1b | Ssap 1b | CTRL 1b | Oui 3b | Pid 2b | |
| 0xAA | 0xAA | 0x03 | 0x000000 | 0x0800 | |

FIG. 8(b) AAL5

| CPCS-PDU | PAD 0~47b | CPCS-UU 1b | CPI 1b | LENGTH 2b | CRC 4b |
|---|---|---|---|---|---|

FIG. 8(c) SAR-PDU

| SAR-PDU 48b | SAR-PDU 48b | SAR-PDU 48b |
|---|---|---|

FIG. 8(d) ATM CELL

| ATM HEADER 5b | ATM PAYLOAD 48b | ATM HEADER 5b | ATM PAYLOAD 48b |
|---|---|---|---| b: byte

| LLC HEADER | | | SNAP HEADER | | PAD | MAC |
|---|---|---|---|---|---|---|
| Dsap 1b | Ssap 1b | CTRL 1b | Oui 3b | Pid 2b | 2b | |
| 0xAA | 0xAA | 0x03 | 0x0080C2 | 0x0007 | 0x0000 | |

CPCS-PDU

| PAD 0~47b | CPCS-UU 1b | CPI 1b | LENGTH 2b | CRC 4b |
|---|---|---|---|---|

| SAR-PDU 48b | SAR-PDU 48b | SAR-PDU 48b |
|---|---|---|

| ATM HEADER 5b | ATM PAYLOAD 48b | ATM HEADER 5b | ATM PAYLOAD 48b |
|---|---|---|---|

FIG. 9(a)  IP DATAGRAM

FIG. 9(b)  AAL5

FIG. 9(c)  SAR-PDU

FIG. 9(d)  ATM CELL

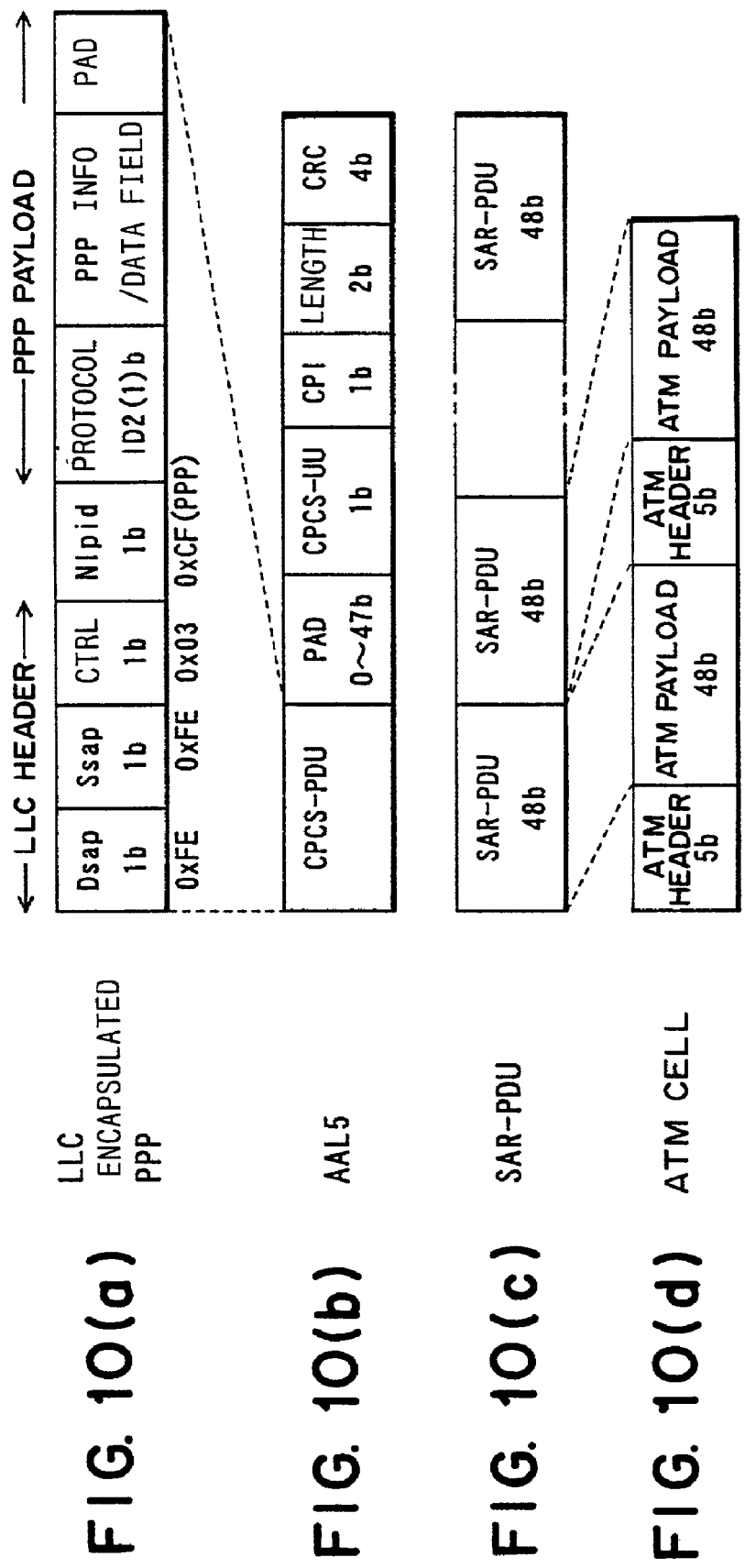

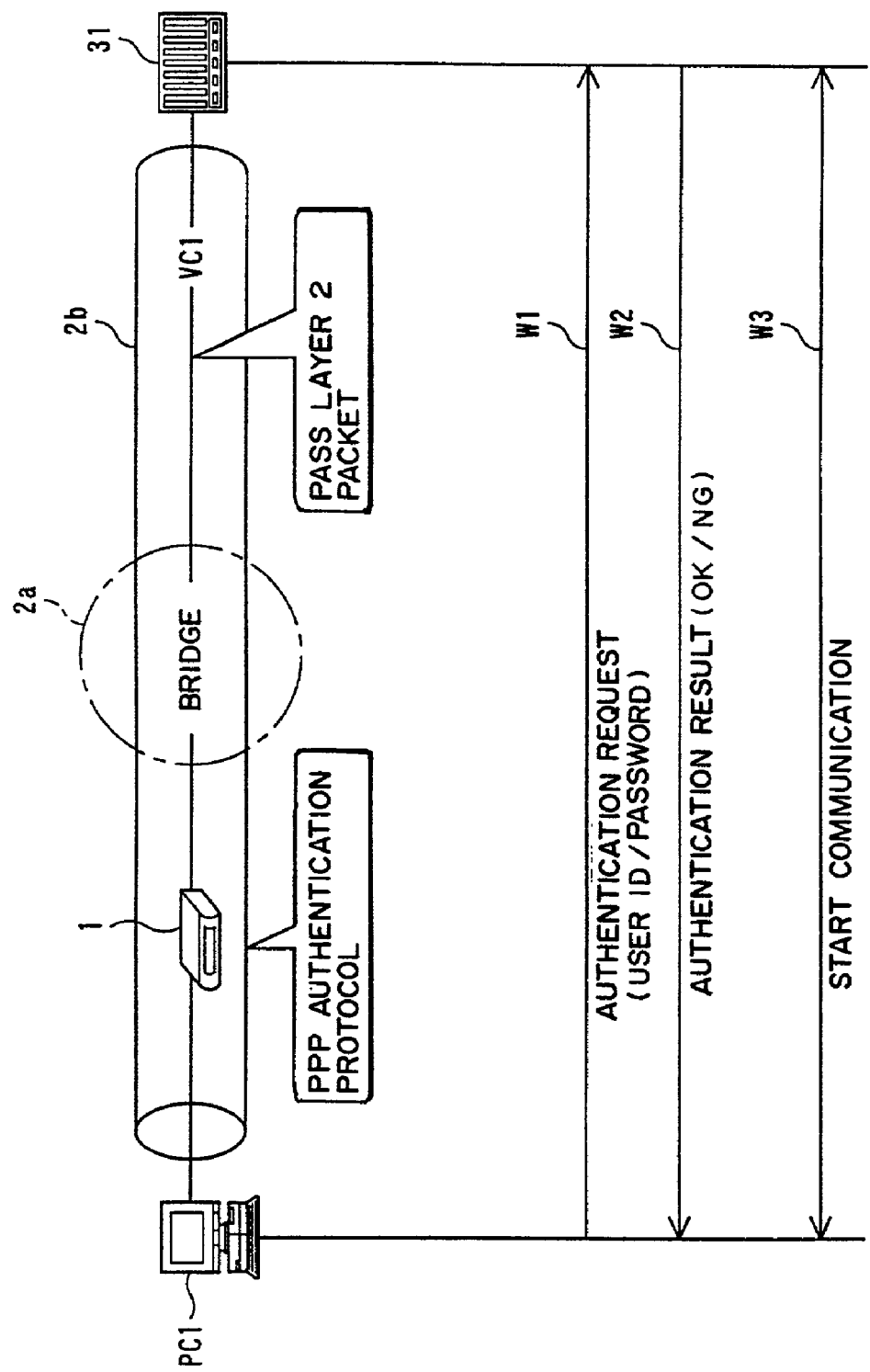

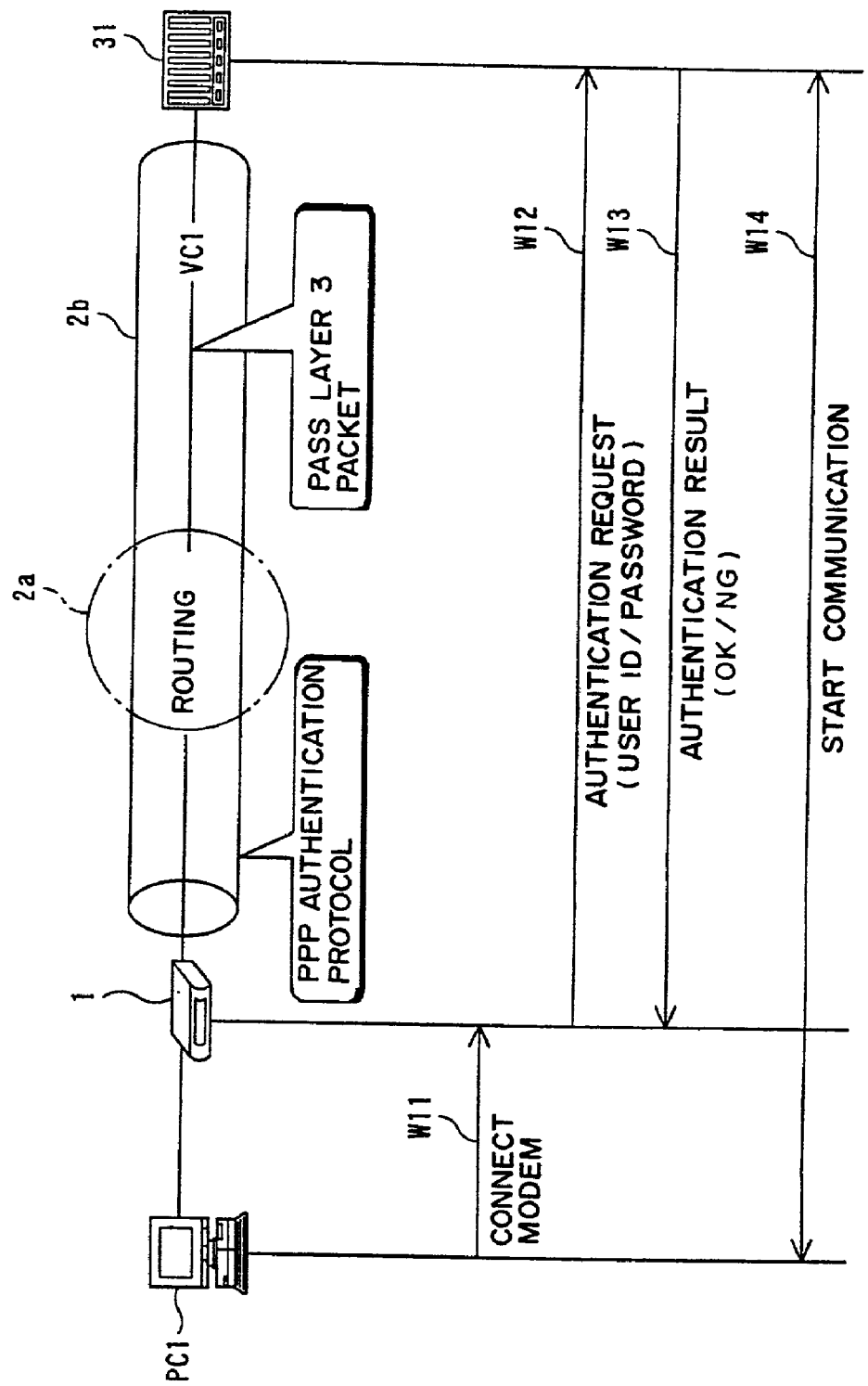

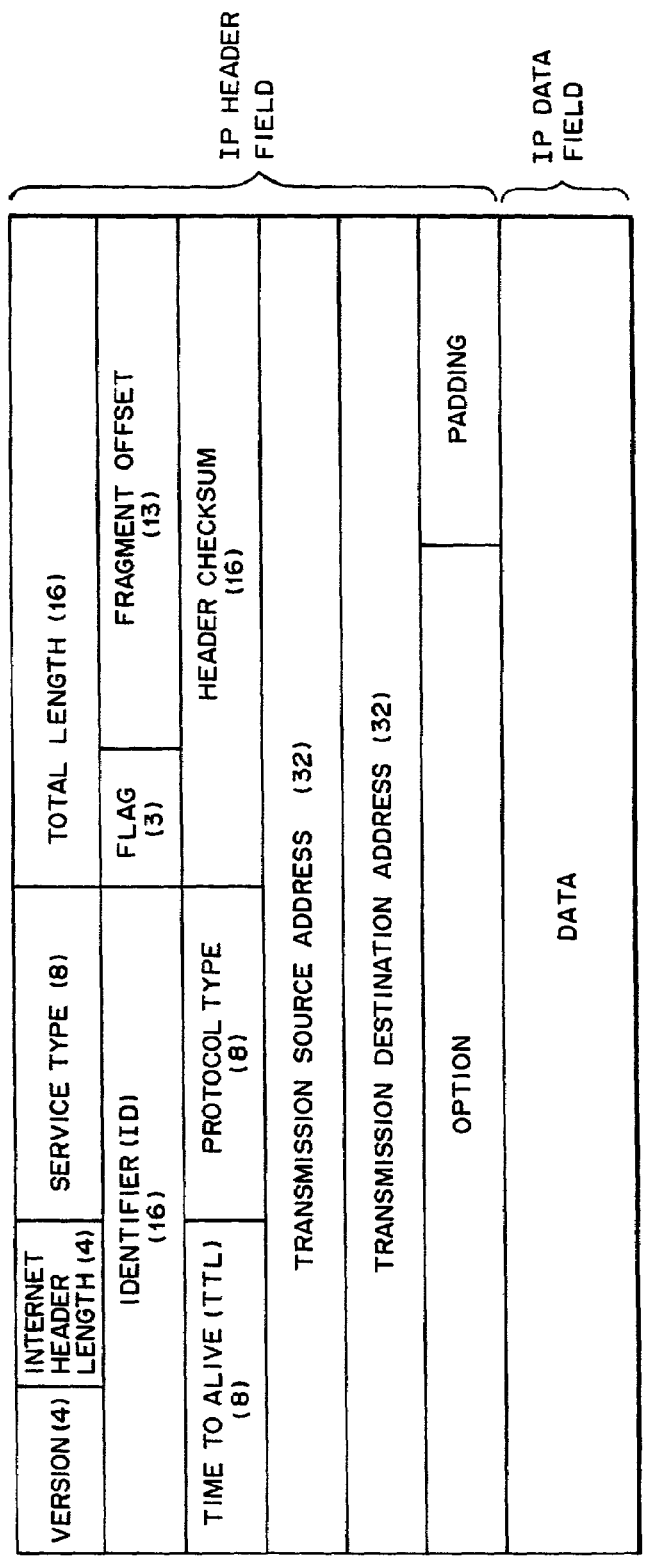
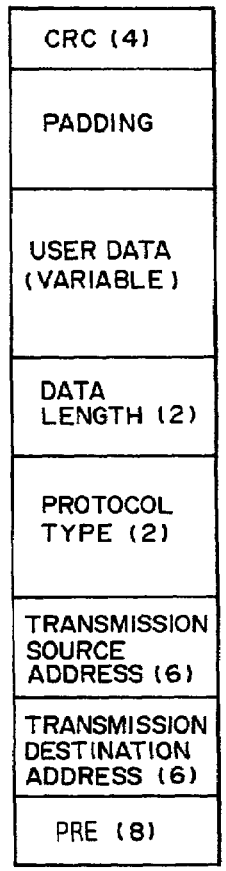

SUBSCRIBER TERMINATING APPARATUS AND PACKET PROCESSING METHOD

BACKGROUND OF THE INVENTION (1) Field of the Invention

The present invention relates to a subscriber terminating apparatus and a packet processing method suitable for use in a DSU (Digital Service Unit) having, for example, a bridging function and a routing function.

(2) Description of Related Art

Because of recent spread of the Internet and development of Internet business, operators of personal computers and telephone subscribers (hereinafter referred as users) wish realization of high-speed, high-quality network environments.

The service in the access system for realizing this wish shifts from the ISDN (Integrated Services Digital Network) service that now spread to the xDSL (x Digital Subscriber Line) service. One of major reasons of this is that the xDSL service can use the metallic line that is presently used as an existing equipment as it is, and can realize a transmission rate not less than ten times that of ISDN.

xDSL signifies in general terms of ADSL (Asymmetric Digital Subscriber Line), MSDSL (Multi-rate Symmetric Digital Subscriber Line) and the like. ADSL is a high-speed transmission method in which data of 1.5 to 9.2 Mbps (megabit per second) is asymmetrically transmitted from the network to the user using a metallic line used for the subscriber telephone line. MSDSL is a symmetrical high-speed transmission system in which data can be bidirectionally transmitted/received.

When the user transmits or receives character codes such as an electronic mail, the user cannot clearly recognize the above transmission rate. When the user transmits or receives a file of a large capacity such as a still image or a moving image, the user can clearly recognize the difference. When the transmission rate is increased, the user comes to demand more improvement of the convenience and additional functions after enjoying pleasant net surfing.

One of the reasons to shift to the xDSL service is that competition to acquire subscribers among providers who provide Internet connection service to users (also referred as Internet service providers or carriers, hereinafter referred to as ISPs [Internet Service Providers]) becomes fierce. Namely, the number of ISPs tends to increase every year. Under such circumstances, each ISP comes to actively appeal its own feature, or there appears an ISP that is specialized to a specific field of business.

With increased ISPs having their own features, it is assumed that the user selects a desirable ISP in each specific field to connect to the Internet when subscribing for a connection service. Namely, the user changes an ISP to be connected according to each application, for example.

Here are defined terms used in the following description. IP (Internet protocol) datagram has an IP address that is an object of processing upper than Layer 3. An example of IP datagram shown in FIG. 15(a), for example, is composed of about 1500 bytes, which includes a transmission source IP address (transmission source network address) and a transmission destination IP address (transmission destination network address) each of 32 bits. An object of processing not upper than Layer 2 is referred to as a frame (for example, Ethernet frame). When there is no necessity to discriminate between IP datagram and the frame, the both are sometimes referred as packets. These terms will be used in the similar way unless specifically mentioned.

Further, a frame shown in FIG. 15(b) has a transmission source MAC (Media Access Control) address and a transmission source MAC address. The MAC address (physical address) is of 48 bits in many cases, which is recorded on a LAN card (not shown) to be connected to, for example, a personal computer when the LAN card is manufactured.

Bridging (bridge) is one of repeating functions of interconnecting networks, which is a function to identify a MAC address of a personal computer or the like in MAC layer at Layer 2 to repeat a frame.

In other words, the bridging function is a function of distributing frames at Layer 2 (Layer 2 level). A frame transmitted/received at Layer 2 cannot express an IP address, so as to be transmitted/received using only a MAC address (physical address). In concrete, a transmission source MAC address is not used, but only a transmission destination MAC address is used to be processed in all times. For this, a bridging apparatus (for example, a bridging modem) manages only transmission destination addresses, thereby realizing the bridging function.

Routing (IP routing) is a function of setting one route suitable for transfer among a plurality of routes leading to a final destination (destination) such as another network system or gateway server.

In other words, the routing function is mainly an IP datagram distributing function at Layer 3 (Layer 3 level). For this, a routing apparatus (routing modem) does not manage MAC addresses at Layer 2 like a bridging apparatus, but has a function equivalent to a general router to route only IP datagram.

FIG. 16 is a diagram illustrating general PPP (Point to Point Protocol) connection. An ATM (Asynchronous Transfer Mode) cell transmission system 50a shown in FIG. 16 is an ATM network system, which is a system that encapsulates IP datagram into an ATM cell and transmits the ATM cell, thereby transferring the IP datagram.

The ATM cell transmission system 50a shown in FIG. 16 comprises, for example, eight personal computers PC1–PC8, a DSU 51 having both of the bridging function and the routing function, an ATM network 2b to which ATM protocol is applied, and ISP-A to ISP-H of eight companies each having an ATM cell transmitting/receiving unit 32 and an authentication server 31. The user transmits IP datagram to the DSU (ADSL modem) 51 using a PPP connection, and transmits/receives IP datagram to/from an ISP. Whereby, an IP network is configured over the ATM network 2b.

In the DSU 51, a protocol between the DSU 51 and the personal computer PC1 and a protocol between the DSU 51 and the ATM network 2b are converted (terminated). This termination is performed by changing or removing a header included in a packet.

Additionally, a direction from the ISP-A to the personal computer PC1 is referred as downstream (downward direction), whereas a direction from the personal computer PC1 to the ISP-A is referred as upstream (upward direction), occasionally, in the following description.

In order to realize bridging and routing, there are mainly two modes of the DSU 51 shown in FIG. 16. One mode is that the DSU separately has a bridging apparatus and a routing apparatus. The other is that blocks (processing blocks) realizing bridging and routing are integrally designed within the DSU 51, and the user operates an external change-over switch disposed in the DSU 51 to select either one of the functions. Incidentally, such modem is sometimes referred as an integrated modem.

In the latter embodiment, the user needs to reboot (restart) the DSU 51 after changing over the external switch in order to make a setting change effective, and the number of connectable ISPs is only one (for example, the authentication server 31 of ISP-D).

There have been proposed various techniques providing bridging and routing.

A technique disclosed in Japanese Patent Laid-Open Publication (Kokai) No. HEI 7-143178 (hereinafter, referred as publication 1) is aimed to readily control a repeating system or a repeater by sending data including a specific calling terminal address not corresponding to another terminal connected to the repeating system or the repeating apparatus from a terminal apparatus. The technique also provides a function of readily controlling the repeating system or the repeating apparatus without changing a protocol between the terminal apparatus, and the repeating system or the repeating apparatus.

According to the technique described in the publication 1 relating to known bridging and routing, when the transmission source and the transmission destination are in the same network, the routing function works. When the transmission source and the transmission destination are in different networks, the technique automatically discriminates it so that the routing function works to transfer data. Therefore, it is possible to connect both in the same network and between different networks.

Japanese Patent Laid-Open Publication (Kokai) No. HEI 7-221783 (hereinafter referred as publication 2) discloses a technique that can switch between the routing process and the bridging process to perform it according to a logical network number and a physical network number arbitrarily designated in each node when data is transmitted between nodes on different LANs (Local Area Networks).

A repeating system in the publication 2 is conscious of only IP layer to operate as a single path when LANs are connected.

When switching between bridging and routing in an integrated modem such as the above-described DSU 51, the user needs to manually change over the external switch or switch internal setting, or set using an external interface such as RS-232C. A reason why the external interface is necessary is that when the apparatus is used as a bridging apparatus, a control signal inputted from the outside cannot be expressed in Layer 2, thus the model cannot recognize the control signal. For this, an integrated modem can provide only either one of the both functions in view of full automation.

With respect to the full automation of the both functions, it is possible to switch between them on the ISP's side. Namely, the ISP allows the user to beforehand select and discriminate which function between routing and bridging is necessary, and the DSU 51 automatically switches, whereby the ISP provides different service modes to users.

Accordingly, the user does not need to set the switching by replacing the DSU 51 itself or by turning an external switch. The ISP can, on the other hand, improve quality of the service to the users.

However, the integrated modem executes bridging and routing using only a transmission destination address when transferring IP datagram over the ATM network 2*b*. For this, the integrated modem cannot recognize a transmission source of IP datagram. Thus, the integrated modem cannot distribute a VC (virtual Channel) number of an output destination in the apparatus using the IP datagram of the transmission destination, and cannot simultaneously connect to a plurality of ISPs.

As one type of general routing apparatuses (routers), there is a brouter apparatus (brouter) that can simultaneously execute bridging and routing. A function of the brouter is to route when a type of a upper protocol is one that the brouter can support, or bridge when a type of the upper protocol is one that the brouter cannot support, not determining with an address like the integrated modem. In this case, the user cannot simultaneously connect to a plurality of ISPs even with the brouter.

A demand for further improvement of quality of the ADSL service with commercially available DSLs is increased. It is forecasted that subscribers for the ADSL service will increase more and more in the future, and various demands will be made. The above problem is a part that particularly requires improvement.

In the technique described in the publication 1, the user does not switch between bridging and routing according to a different service mode provided by each ISP.

The repeating system described in the publication 2 relates only IP of a single path but does not relates ATM layer of the ADSL line when connecting LANs. For this, the repeating system cannot distribute a plurality of VCs in the modem.

The techniques described in the publication 1 and the publication 2 discriminate switching between bridging and routing using only an IP address (network number), but do not discriminate a personal computer that is a transmission source with a MAC address.

SUMMARY OF THE INVENTION

In the light of the above problems, an object of the present invention is to provide a subscriber terminating apparatus and a packet processing method with respect to an IP datagram transmission technique in an ATM network, which can automatically discriminate between bridging and routing, can simultaneously connect to a plurality of ISPs, thus enables the user to receive different service modes.

The present invention therefore provides a subscriber terminating apparatus comprising a selecting unit for selecting a type of distributing representing distribution to bridging or routing for a packet having at least a transmission source address, a routing processor for bridging the packet when the selecting unit selects bridging to generate a bridging packet, a routing processor for routing the packet when the selecting unit selects routing to generate a routing packet, and a terminating unit for encapsulating the bridging packet or the routing packet using a predetermined cell to generate an encapsulating cell.

Whereby, the user can simultaneously connect to servers connected to a plurality of networks. The user can also select a server in each specific field, and receive different service modes.

The selecting unit may comprise a routing system setting table relating a transmission source network address, deliverable information on a transmission destination and a type of distribution representing distribution to either bridging or routing, and holding them. In such case, it becomes possible to automatically discriminate a type of distribution that the user desires.

The selecting unit may comprise a learning table relating, at least, a unique identifier, a transmission source physical address, a transmission source network address, a type of distribution representing distribution to either bridging or routing and deliverable information on a transmission destination, and holding them.

In such case, the user can deliver the same packet to a plurality of ISPs. Additionally, it is possible to keep a throughput for packets, prevent occurrence of wasteful traffic, and shorten the processing time.

The selecting unit may selects the distribution by retrieving the type of distribution held in the routing system setting table on the basis of the transmission source network address included in the packet. In such case, it is possible to prevent a packet whose physical address is not recorded to be transmitted to a upper layer, for example.

The routing processor may comprise a routing table relating, at least, a transmission destination network address, subnetwork mask and a port number to be routed, and holding them. In such case, the user can configure a network over a predetermined protocol.

Additionally, the routing processor may comprise a point-to-point processing unit for outputting a routing packet undergone a protocol process for a network connection using a public line. In such case, the user can set according to a service mode of the ISP.

The terminating unit may handle an asynchronous transfer mode cell as the predetermined cell. In such case, fully automated packet transmission becomes possible.

The terminating unit may assign at least either a virtual channel or a virtual path as the deliverable information. In such case, it is possible to automatically discriminate between bridging and routing.

The present invention further provides a subscriber terminating apparatus comprising a selecting unit for selecting a type of distribution representing distribution to either a first distributing process at a first layer or a second distributing process at a second layer for a packet having at least a transmission source address, a first distributing processor for performing the first distributing process on the packet when the selecting unit selects the first distributing process to generate a first packet undergone the first distributing process, a second distributing processor for performing the second distributing process on the packet when the selecting unit selects the second distributing process to generate a second packet undergone the second distributing process, and a terminating unit for encapsulating the first packet undergone the first distributing process or the second packet undergone the second distributing process using a predetermined cell to generate an encapsulating cell.

Accordingly, the bridging function and the routing function can be exhibited in both the upstream and downstream.

The present invention still further provides a subscriber terminating apparatus comprising a learning table for relating at least a unique identifier, a transmission source physical address, a transmission source network address, a type of distribution representing distribution to either bridging or routing, and first deliverable information on a transmission destination, and holding them, a terminating unit for extracting second deliverable information on a transmission destination from a predetermined cell having at least the second deliverable information, and outputting a packet on the basis of the second deliverable information and the first deliverable information held in the learning table; a bridging processor for bridging the packet outputted from the terminating unit, a routing processor for routing the packet outputted from the terminating unit, and a selecting unit for selectively outputting either the packet bridged at the bridging processor or the packet routed at the routing processor.

Accordingly, fully automated packet transmission becomes possible.

The present invention still further provides a packet processing method comprising the steps of a setting step of setting a type of distribution representing distribution to either bridging or routing in a subscriber terminating apparatus connected to a network with respect to a service provided by a server connected to the network, a transmitting step of transmitting packets each including a transmission source network address from a terminal signing up for the subscriber terminating apparatus to a plurality of providers, an address specifying step of specifying the transmission source network address included in each of the packets transmitted at the transmitting step, a selecting step of selecting the type of distribution for each of the packets specified at the address specifying step, and a processing step of processing each of the packets on the basis of the type of distribution selected at the selecting step.

Accordingly, the user does not need to replace the subscriber terminating apparatus or turn the switch aware of a connection system differing from Internet service provider to Internet service provider, so as to carry out bridging and routing in parallel.

At the processing step, deliverable information on a transmission destination may be processed with a unique identifier. In such case, it is possible to beforehand discriminate which bridging or routing the user desires.

The processing step may comprise a learning step of learning the unique identifier using a learning table relating at least a unique identifier, a transmission source physical address, a transmission source network address, a type of distribution representing distribution to either bridging or routing and deliverable information on a transmission destination, and holding them, and a transmitting step of transmitting the packet to the plural providers on the basis of the unique identifiers learned at the learning step. In such case, since the method includes the transmitting step of transmitting packets to a plurality of providers, the user can carry out, for example, a process at Layer 2 and a process at Layer 3 in parallel.

The present invention still further provides a packet processing method comprising the steps of an extracting step of extracting a type of distribution representing distribution to either bridging or routing for a packet having at least a transmission source address, a selecting step of selecting the type of distribution extracting at the extracting step on the basis of a learning table relating at least a unique identifier, a transmission source physical address, a transmission source network address, a type of distribution representing distribution to either bridging or routing and deliverable information on a transmission destination and holding them, and an encapsulating step of encapsulating the packet using a predetermined cell to which the deliverable information included in the learning table is given according to the type of distribution selected at the selecting step to generate an encapsulating cell.

Accordingly, it is possible to remarkably increase the number of transmittable destinations, and accommodate a number of subscribers.

The present invention still further provides a packet processing method comprising the steps of a terminating step of outputting a packet included in an encapsulating cell encapsulated in a predetermined cell having at least either a virtual channel or a virtual path, and at least either the virtual channel or the virtual path in a subscriber terminating apparatus connected to a network, a learning table referring step of referring to a learning table relating at least a unique identifier, a transmission source physical address, a transmission source network address, a type of distribution representing distribution to either bridging or routing and first deliverable information on a transmission destination and holding them, and a transmitting step of transmitting the packet to a terminal signing up for the subscriber terminating apparatus on the basis of the virtual channel or the virtual path included in the packet outputted at the terminating step, and the virtual channel or the virtual path held in the learning table referred at the learning table referring step.

Accordingly, all distribution can be automated since the user carries out the processing using a tag number held in the learning table without accessing to a packet itself.

BRIEF DESCRIPTION OF THE DRAWINGS

FIG. 4 is a diagram showing an example of a routing system setting table according to the embodiment of the present invention;

FIG. 5 is a diagram showing an example of a learning table according to the embodiment of the present invention;

FIG. 6 is a diagram showing an example of a routing table according to the embodiment of the present invention;

FIG. 7 is a diagram for illustrating a data processing flow according to the embodiment of the present invention;

FIGS. 8(a) through 8(d) are diagrams for illustrating encapsulation at the time of routing;

FIGS. 9(a) through 9(d) are diagrams for illustrating encapsulation at the time of bridging;

FIGS. 10(a) through 10(d) are diagrams for illustrating encapsulation of a PPP frame;

FIG. 13 is a diagram for illustrating a sequence in a bridging process according to the embodiment of the present invention;

FIG. 14 is a diagram for illustrating a sequence in a routing process according to the embodiment of the present invention;

FIG. 15(a) is a diagram showing an example of IP datagram;

FIG. 15(b) is a diagram showing an example of a frame; and

DESCRIPTION OF THE PREFERRED EMBODIMENTS

Hereinafter, description will be made of an embodiment with reference to the accompanying drawings.

(A) Description of an Embodiment of the Invention

Figure 1:
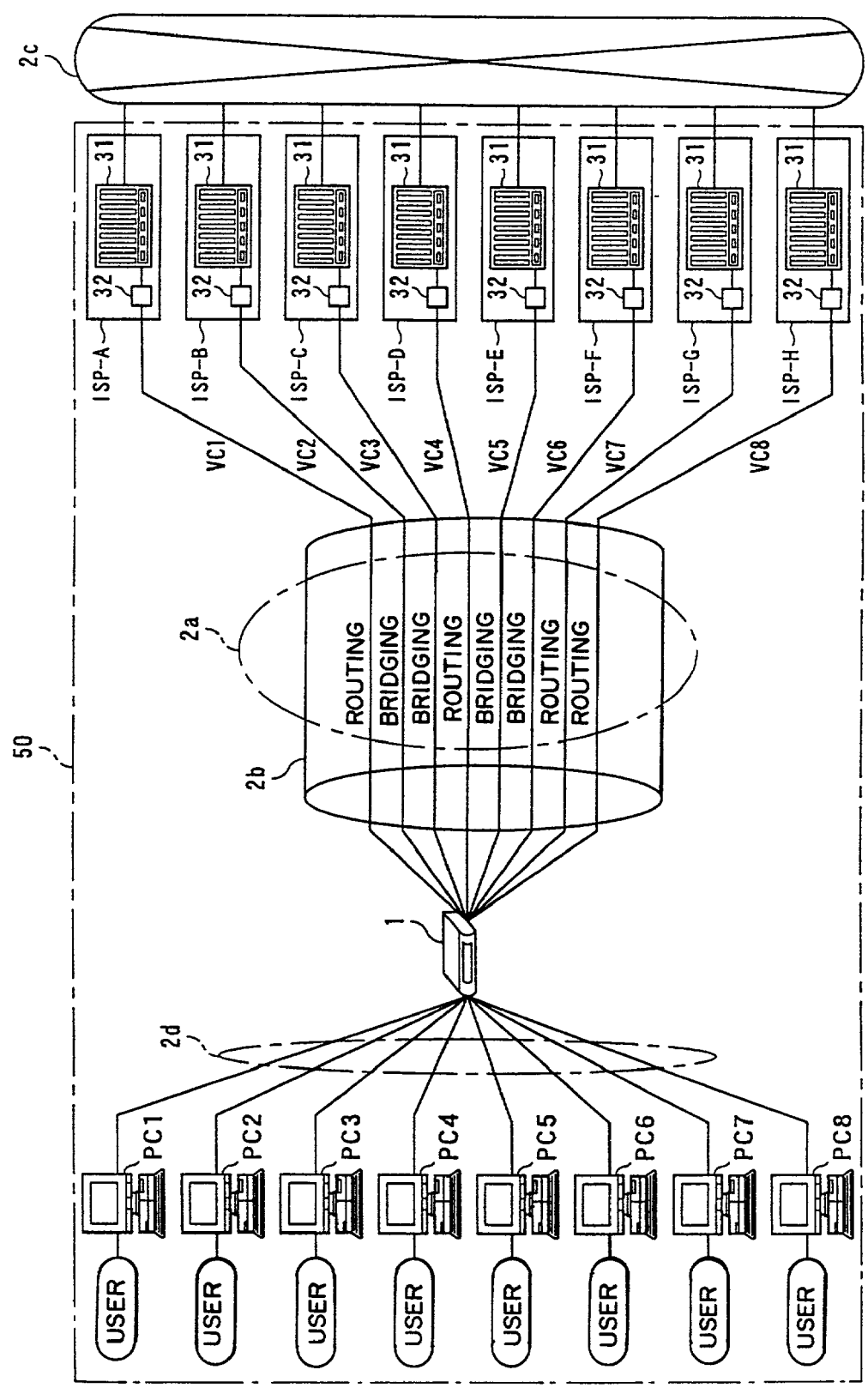
FIG. 1 is a diagram showing a cell transmission system according to an embodiment of the present invention.

FIG. 1 is a diagram showing a structure of a cell transmission system according to an embodiment of the present invention. An ATM cell transmission system 50 shown in FIG. 1 is a network system which transmits/receive ATM cells, and provides an IP datagram transfer service. The ATM cell transmission system 50 comprises a plurality of personal computers PC1–PC8, subscriber telephone lines 2*d*, a DSU (subscriber terminating apparatus) 1, an ATM network 2*b*, and ISP(Internet Service Provider)-A to ISP-H.

Each of the personal computers PC1–PC8 is a terminal having a function of executing software applications (hereinafter abbreviated as applications, occasionally) and a communication function, which can execute an application for PPP connection, for example. Each of the personal computers PC1–PC8 is as shown in FIG. 11, for example.

Figure 11:
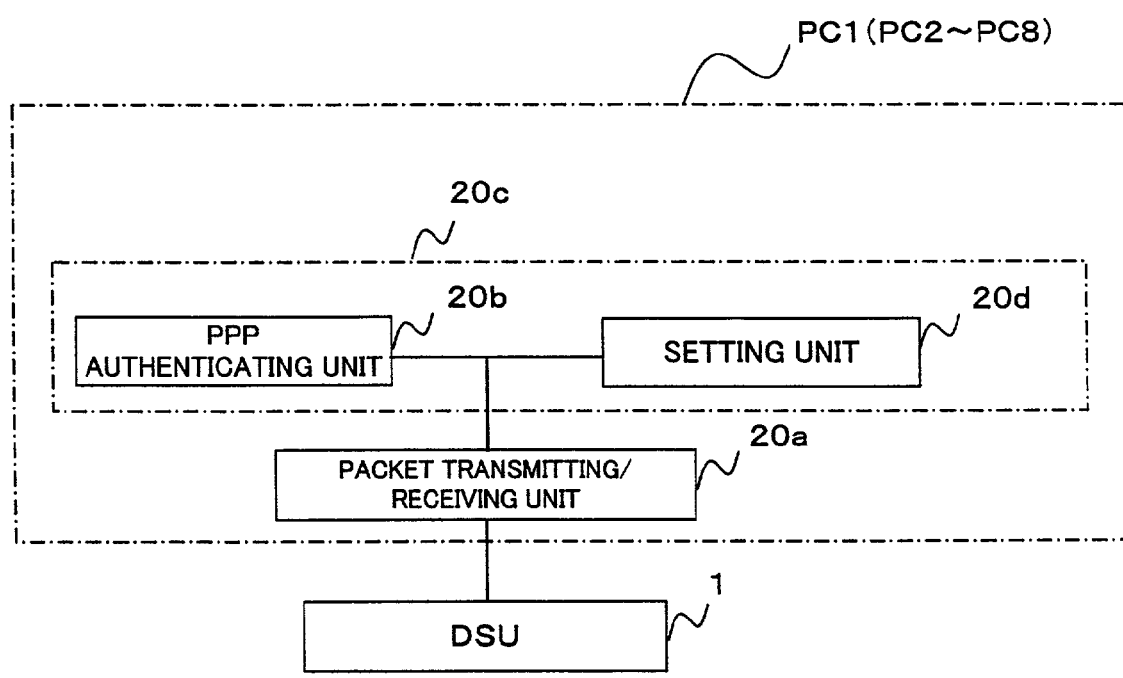
FIG. 11 is a schematic block diagram of a personal computer according to the embodiment of the present invention.

FIG. 11 is a schematic block diagram of the personal computer PC1 according to the embodiment of the present invention. The personal computer PC1 shown in FIG. 11 comprises a packet transmitting/receiving unit 20*a* and an application processing unit 20*c*. The packet transmitting/receiving unit 20*a* transmits/receives a packet (IP datagram or a frame) to/from the DSU 1. This function is accomplished by, for example, a modem.

The application processing unit 20*c* executes applications, which comprises a PPP authenticating unit 20*b* and a setting unit 20*d* besides having general applications. The PPP authenticating unit 20*b* executes authentication in PPP protocol. This function is accomplished by PPP authentication software installed by the user. The setting unit 20*d* is for setting to the DSU 1 by the user. The setting unit 20*d* starts up browsing software in conformity with, for example, HTTP (HyperText Transfer Protocol), whereby the user can set data for control on the DSU 1. Incidentally, each of the other personal computers PC2–PC8 has the similar structure.

In FIG. 1, data created by the user is sent to the DSU 1. In the DSU 1, the data is converted into ATM cells. Whereby, the data can be transmitted/received to/from the IP network 2*c*.

The subscriber telephone lines 2*d* are metallic cables. Each of the subscriber telephone lines has, for example, an upstream transmission rate of 16 to 640 kbps (kilobit per second) and a downstream transmission rate of 1.5 to 9.2 Mbps (megabit per second).

The ATM network 2*b* is ADSL lines for transmitting/receiving ATM cells ATM-layer-processed, which comprises ATM switching systems, ATM routers and the like although not shown.

The ATM layer has functions of multiplexing cells, demultiplexing the cells, and setting a plurality of virtual channels (also referred as VC numbers or output VC numbers; hereinafter referred as VCs, occasionally) and virtual paths (also referred as VP numbers or output VP numbers; hereinafter referred as VPs, occasionally), which executes, for example, AAL (ATM Adaptation Layer) processing. VC is a bidirectional, logical data path between two points in the ATM network 2*b*. By virtue of VC, high-quality communication becomes possible. VP is a conceptual group in which plural VCs are bundled, which represents a traffic quantity on a predetermined route. By virtue of VP, it is possible to prevent congestion in traffic on the same route.

In the ATM layer processing, an IP address and a VC are correlated with each other, so that the IP network 2*a* (indicated by a virtual dash-dotted line in FIG. 1) is configured in the ATM network 2*b*. As a result, an IP is configured over ATM (IP over ATM).

The IP network 2*c* is connected to the ATM cell transmission system 50 to transfer IP datagram to another network (not shown).

Each of the ISP-A to ISP-H is a company or the like providing Internet connection service to the users. The ISP-A to ISP-H also include a company providing a service specified to a specific field other than general companies. In other words, the user can simultaneously connect to eight companies each having its own unique feature.

Figure 12:
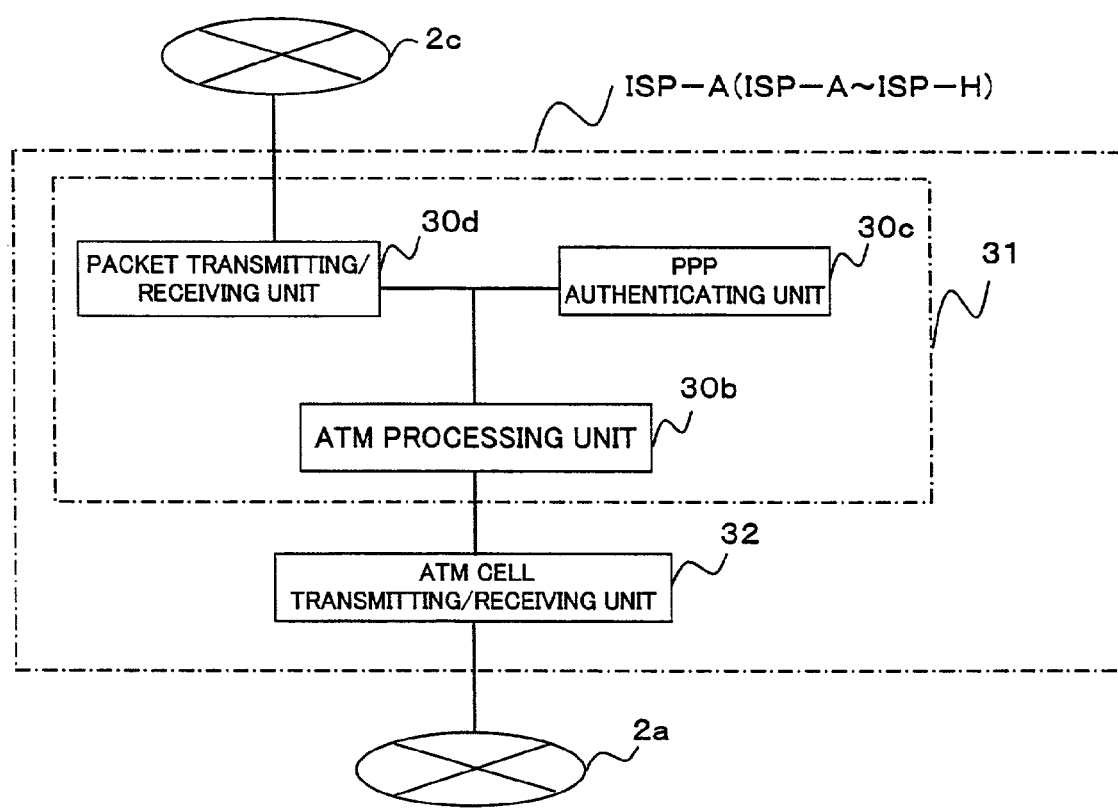
FIG. 12 is a diagram showing an example of a schematic structure of an ISP according to the embodiment of the present invention.
Figure 16:
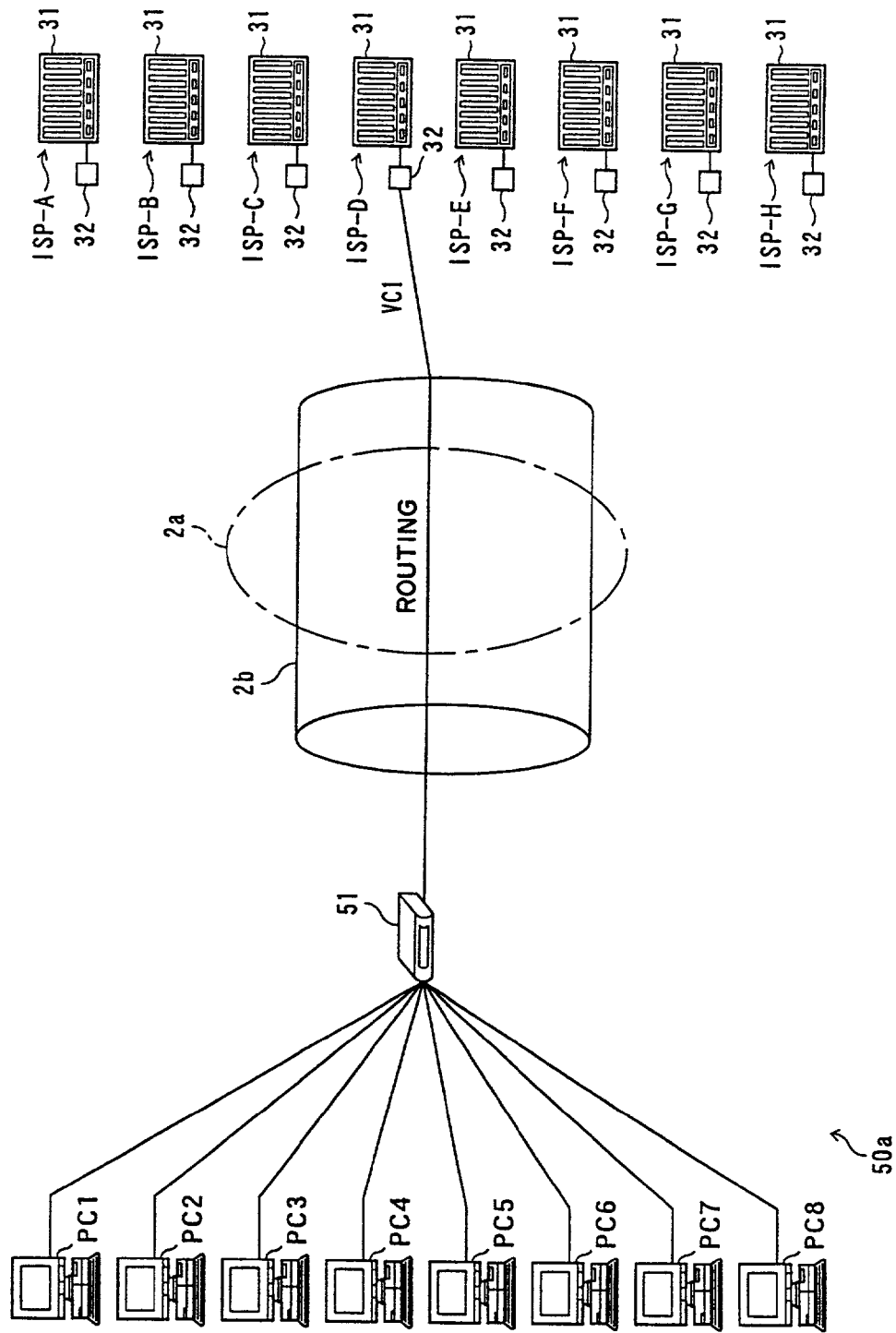
FIG. 16 is a diagram for illustrating known PPP connection.

FIG. 12 is a diagram showing an example of a schematic structure of the ISP-A according to this embodiment of the present invention. ISP-A shown in FIG. 12 comprises an authentication server 31 and an ATM cell transmitting/receiving unit 32. The authentication server 31 is a server transferring IP datagram, which comprises an ATM processing unit 30b, a PPP authenticating unit 30c and a packet transmitting/receiving unit 30d. The ATM processing unit 30b transmits/receives an ATM cell, besides assembling and deassembling ATM cells included in that ATM cell. The PPP authenticating unit 30c authenticates the user. The packet transmitting/receiving unit 30d transmits/receives a packet (IP datagram or frame) to/from the IP network 2c. A function of the authentication server 31 is accomplished by, for example, a work-station or a personal computer.

The ATM cell transmitting/receiving unit 32 transmits/receives an ATM cell. This function is accomplished by, for example, an IC (Integrated Circuit).

Incidentally, each of the ISP-B to ISP-H has the similar structure to the ISP-A, duplicated description of which is thus omitted. The number of the users or ISPs may be larger than eight.

In FIG. 1, an ATM cell from the ATM network 2b is disassembled in the ATM cell transmitting/receiving unit 32 in the ISP-A, and a packet is inputted to the authentication server 31. In the PPP authenticating unit 30c of the authentication server 31, an IP address included in the packet is extracted, for example, so that the PPP connection is authenticated. When the authentication is successful, the packet is sent from the packet transmitting/receiving unit 30d to the IP network 2c.

A packet from the IP network 2c is inputted to the ATM processing unit 30b through the packet transmitting/receiving unit 30d. In the ATM processing unit 30b, an ATM cell is generated. The ATM cell is sent from the ATM cell transmitting/receiving unit 32 to the ATM network 2b.

The user can thereby access to the DSU 1 in a PPP connection with, for example, the personal computer PC1. In the DSU 1, the packet sent from the personal computer PC1 is converted into an ATM cell, and VC1, VC2, . . . or VC8 is attached thereto. The ATM cell is then sent to any one of the ISP-A to ISP-H, so that IP datagram is transmitted/received to/from the IP network 2c.

Another user can transmit/receive a packet using the personal computer PC2, PC3, . . . or PC8 to/from the IP network 2c over the ATM network 2b.

The user can thereby simultaneously connect to the ISPs of eight companies. When each of the ISP-A to ISP-H has its own feature, the user can select an ISP in a specific field, thereby receiving a different service mode.

The DSU 1 is a subscriber terminating apparatus connected to the ATM network 2b, which is an ADSL modem (ADSL DSU) of an asymmetric digital subscriber line. The DSU 1 is disposed in a house or office of the user to also function as a subscriber-premises equipment. The user can use the xDSL connection service and the like provided by the ISP.

In concrete, the DSU 1 converts data to be transmitted over an existing subscriber telephone line 2d into an ATM cell, and transmits the ATM cell to the ATM network 2b. On the other hand, the DSU 1 receives an ATM cell from the ATM network 2b, takes out IP datagram or a frame from the received ATM cell, and transmits it to the personal computer PC1, PC2, . . . or PC8. Incidentally, "asymmetric" signifies that the upstream transmission rate differs from the downstream transmission rate.

The DSU 1 can thereby transmits/receives data in a high frequency band between the user and the ATM network 2b. It is therefore possible to transmit/receive data at a high speed without using an optical fiber for the subscriber telephone line.

Next, flows of data in the downstream and upstream in the DSU 1 will be described.

Figure 2:
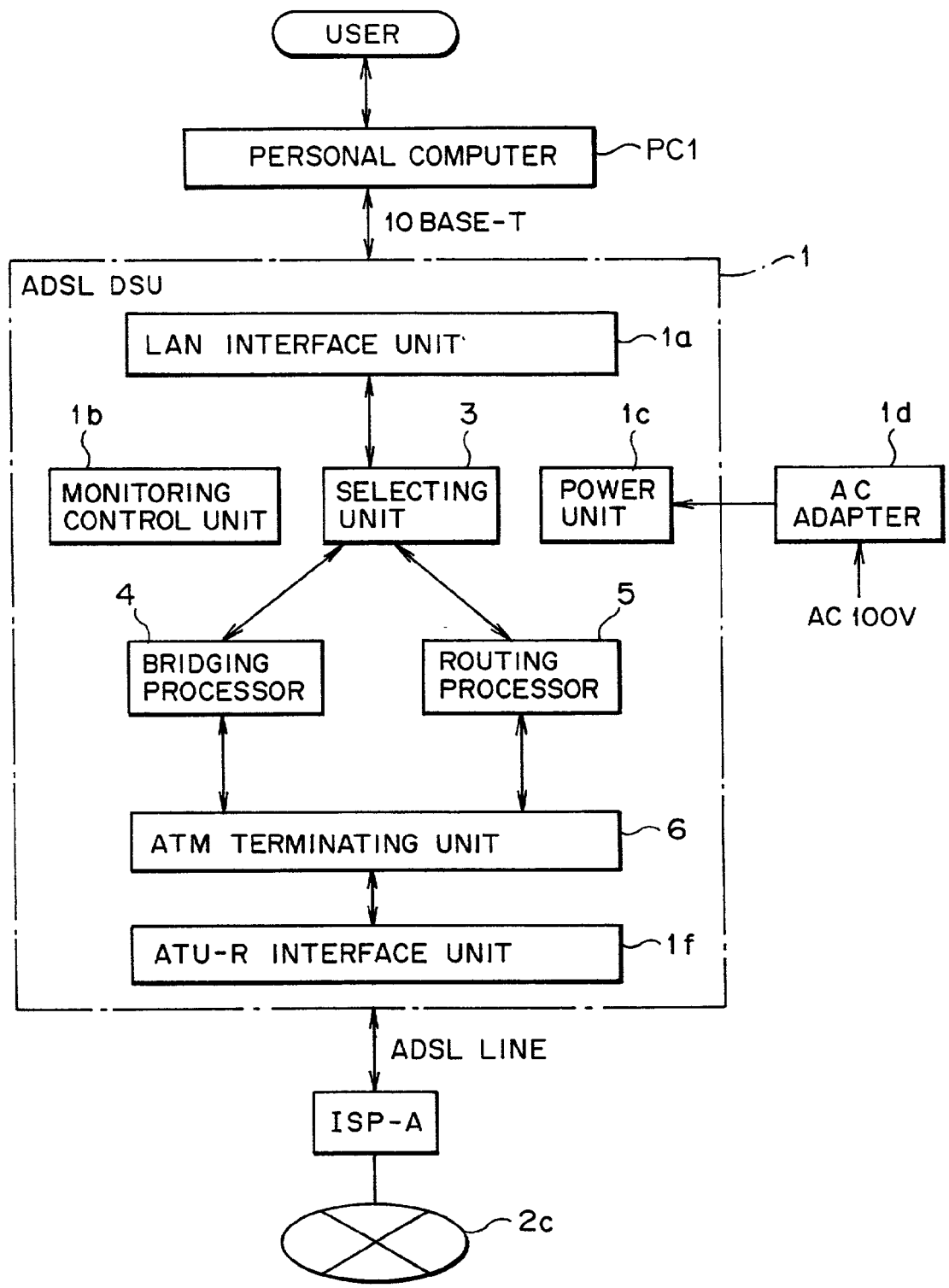
FIG. 2 is a schematic block diagram of a DSU according to the embodiment of the present invention.

FIG. 2 is a schematic block diagram of the DSU 1 according to the embodiment of the present invention. The DSU 1 shown in FIG. 2 comprises a LAN interface unit 1a, a monitoring control unit 1b, a selecting unit 3, a power unit 1c, a bridging processor (first distributing processor) 4, a routing processor (second distributing processor) 5, an ATM terminating unit (terminating unit) 6, and an ATU-R (ADSL Termination Unit-Remote) interface unit 1f. The DSU 1 sends data upstream (from user to ISP), besides sending data downstream (from ISP to user). In FIG. 2, like reference characters designate parts having the same or similar functions, further descriptions of which are thus omitted.

The LAN interface unit 1a assembles upstream frames transmitted from the respective personal computers PC1–PC8 to generate IP datagram. The LAN interface unit 1a also disassembles downstream IP datagram, and sends frames to the personal computers PC1–PC8. The LAN interface unit 1a is connected by a cable of, for example, 10BASE-T (representing a type of standard name) to the personal computer PC1. In concrete, IP datagram to be processed by the LAN interface unit 1a is as shown in FIG. 7, for example.

A received LAN packet 10a shown in FIG. 7 is IP datagram, which includes data regions of a transmission destination MAC address, a transmission source MAC address, a frame type (IP), a transmission destination IP address, a transmission source IP address, data, padding and FCS (Frame Check Sequence).

The transmission destination MAC address is a physical address of an addressed apparatus. The transmission source MAC address is a physical address of an apparatus having originated. The transmission destination IP address is an IP address of the addressed apparatus. The transmission source IP address is an IP address of the apparatus having originated. Namely, IP datagram outputted from the LAN interface unit 1a has both a MAC address and an IP address. The frame type (IP) represents that the data is IP datagram. The data is a region in which information data is written. The padding is a region in which dummy data for offsetting is inserted to be written in order that the frame length becomes a predetermined length when the data length is shorter. The FCS is a region in which parity for detecting an error is written.

In FIG. 7, like reference characters designate parts having the same or similar functions, further descriptions of which are thus omitted.

In FIG. 2, the monitoring control unit 1b sets an operation with respect to each block in the DSU 1, besides monitoring a ramp control or alarm in the DSU 1. The user can set an operation of the DSU 1 using the monitoring control unit 1b. Namely, the user can set with SNMP (Simple Network Management Protocol) transmitted from the upper apparatus. Alternatively, the user can control with data for control transmitted from a local personal computer of the personal computer PC1, for example, to set. Accordingly, occurrence of abnormal operation in each block and the like is monitored at all times, the DSU 1 can thereby smoothly operate.

The power unit 1c supplies direct-current power source to the DSU 1. An external AC (Alternating Current) adapter 1d is connected to the power unit 1c, and the power unit 1c generates various direct current voltages using electric power supplied from the AC adapter 1*d*. This function is accomplished by, for example, a DC (Direct Current)-DC converter, for example, outputting a direct current voltage. Incidentally, the AC adapter 1*d* converts electric power from, for example, a home plug socket of 100 volt to supply it to the power unit 1*c*.

In the upstream, the selecting unit 3 routes or bridges a packet (IP datagram or a frame) inputted from the LAN interface unit 1*a*. Namely, the selecting unit 3 selects a type of distribution (distributing system) representing distribution of an IP packet having a transmission source IP address (transmission source network address) to a first distributing process (bridging process) at a first layer (Layer 2) or a second distributing process (routing process) at a second layer (Layer 3).

In the down stream, the selecting unit 3 selectively outputs either one of a packet bridged at the bridging processor 4 or a packet routed at the routing processor 5.

In the upstream, the routing processor 4 bridges a packet when the selecting unit 3 selects the bridging process to generate a packet undergone the bridging process. The routing processor 4 has an IP address converting function. The routing processor 4 selects an appropriate route to the destination of the packet, and converts the address to an address to which the packet should be sent next.

By means of bridging, an address filtering function is fulfilled to identify a MAC address of a terminal of each of the personal computers PC1–PC8 to allow only a specific frame to pass through to another transmission route. The routing processor 4 encapsulates a packet into an ATM cell.

In the downstream, the routing processor 4 converts an IP address. Namely, the bridging unit 4 bridges a packet outputted from the ATM terminating unit 6.

In the upstream, the routing processor 5 routes a packet. Namely, the routing processor 5 routes a packet when the selecting unit 3 selects the routing process to generates a packet undergone the routing process. The routing processor 5 encapsulates the packet into an ATM cell, as well.

In the downstream, the routing processor 5 routes a packet outputted from the ATM terminating unit 6.

Accordingly, bridging and routing are performed in both of the upstream and downstream directions in the DSU 1.

In the upstream, the ATM terminating unit 6 encapsulates a packet undergone the bridging process or a packet undergone the routing process into an ATM cell to generate the ATM cell (encapsulating cell). The ATM terminating unit 6 assigns VCs correlating the eight users with the authentication servers 31, as deliverable information. Namely, the ATM terminating unit 6 terminates an ATM cell (AAL5, in concrete), thereby fulfilling its cell processing function.

The deliverable information is information about transmission destinations, which signifies a plurality of destinations of packets transmitted from, for example, the personal computer PC1. Namely, packets transmitted from one personal computer PC are delivered to not only ISP-A of one company but also a plurality of ISPs such as ISP-B, ISP-D, ISP-H and the like. For this, the deliverable information is managed.

A function indicating the deliverable information is mainly accomplished with either one of VC and VP included in the ATM cell header, or both of VC and VP. Hereinafter, VC is used as the deliverable information unless specifically mentioned.

As deliverable information, VP may be used. In such case, the DSU 1 can set, for example, a maximum of 0 to 65535 connections of VP so as to set a maximum of 0 to 65535 VPs between the DSU 1 and an intra-office apparatus upper than the DSU 1. Whereby, packets from the user can be certainly transmitted to objective servers.

Accordingly, the ATM terminating unit 6 handles an ATM (Asynchronous Transfer Mode) cell as a predetermined cell. The ATM terminating unit 6 assigns VCs as deliverable information. Namely, it is possible to set the deliverable information as a plurality of numbers.

In more detail, the ATM terminating unit 6 has VCs, disassembles an encapsulating ATM cell, and outputs packets (IP datagram or frames) and VCs.

In the upstream, the ATM terminating unit 6 bridges or routes a packet transmitted from the user, gives a header to the processed packet, and outputs an ATM cell to which the header is given to the ADSL line through the ATU-R interface unit 1*f*.

In the downstream, the ATM terminating unit 6 can transmit data. Namely, the ATM terminating unit 6 extracts the second VC from an ATM cell having the second VC relating to a transmission destination, and outputs a packet on the basis of the second VC and the first VC held in a learning table 3*c* to be described later.

In more detail, in the downstream, the ATM terminating unit 6 reads a VC included in an ATM header when disassembling the received ATM cell. The ATM terminating unit 6 refers to the learning table 3*c* (refer to FIG. 3) holding a tag number, a transmission source MAC address, a transmission source IP address, a type of distribution representing distribution to either one of bridging and routing and a VC relating to a transmission destination of the read VC, extracts an IP address or a MAC address to which a packet should be transferred, and transmits the packet from which the ATM header has been removed to a user.

In either of the upstream or the downstream, all the IP datagram, frames and ATM cells are processed on the basis of data of the learning table 3*c* beforehand held.

Next description will be made of an encapsulating system in the ATM terminating apparatus 6. The ATM terminating unit 6 supports, for example, RFC (Request for Comments) 1483 handling LLC (Logical Link Control) encapsulation, and a packet without FCS in order to encapsulate into an ATM cell. In the routing connection, there are encapsulation (normal LLC header) of an ISO-CLNP (International Organization for Standardization-Connectionless Network Protocol) packet and encapsulation of IP datagram. In the bridging connection, there is encapsulation of a frame. These format can cope with either case. An example of mapping will be next described with reference to FIGS. 8(*a*) through 8(*d*) to FIGS. 10(*a*) through 10(*d*).

FIGS. 8(*a*) through 8(*d*) are diagrams for illustrating encapsulation at the time of routing, showing formats in conformity to RFC1483. Incidentally, "1b" shown in FIG. 8(*a*) represents one byte, and 0x represents a hexadecimal number. These are the same to "b" shown in FIGS. 8(*a*) through 8(*d*) to 10(*a*) through 10(*d*).

FIG. 8(*a*) shows an example of data of IP datagram. LLC is a part for control in order to certainly transmit data to, for example, an adjacent personal computer or the like. SNAP (Sub Network Access Point) relates to the control. FIG. 8(*b*) shows an example of data of AAL5. FIG. 8(*c*) shows an example of data of SAR-PDU (Segmentation and Reassembly-PDU). FIG. 8(*d*) shows an example of data of ATM cells.

FIGS. 9(*a*) through 9(*d*) are diagrams for illustrating encapsulation at the time of bridging, showing formats in conformity to RFC1483. FIG. 9(*a*) shows an example of data of IP datagram, which is an example of IEEE (Institute of Electrical and Electronics Engineers) 802.3 standards. In FIG. 9(a), PAD represents padding. FIG. 9(b) shows an example of data of AAL5, in which CPCS-PDU (Common Part Convergence Sublayer-Protocol Data Unit) represents a message. FIG. 9(c) shows an example of data of SAR-PDU (Segmentation and Reassembly-Protocol Data Unit). FIG. 9(d) shows an example of data of ATM cells.

FIGS. 10(a) through 10(d) are diagrams for illustrating encapsulation of a PPP frame, showing formats in conformity to RFC2364. FIG. 10(a) shows an example of LLC data extended to PPP protocol. FIG. 10(b) shows an example of data of AAL5. FIG. 10(c) shows an example of data of SAR-PDU. FIG. 10(d) shows an example of data of ATM cells.

The ATU-R interface unit 1f (refer to FIG. 2) modulates/demodulates communication data on the ADSL line. In concrete, the ATU-R interface unit 1f transmits/receives a packet from/to an ISP using the ADSL line.

When the personal computer PC1, for example, transmits a plurality of packets addressed to ISPs of eight companies to which, for example, the personal computer PC1 desires to connect, the DSU 1 routes or bridges the plural packets. Namely, in the DSU 1, IP datagram data or MAC frame data is encapsulated into an ATM cell, and given VC1. The ATM cell including an IP packet to which VC1 has been given is transmitted to the ADSL line through the ATU interface, transferred through VC1 over the ATM network 2b, and transmitted to ISP-A. Data inputted to the ATU-R interface 1f from the ATM network 2b is transmitted in the reverse procedure.

The DSU 1 can therefore fulfil both functions of bridging and routing. The DSU 1 distributes to bridging at Layer 2 and routing at Layer 3, thereby automatically discriminating between the both functions to realize them without changing the unit itself or turning the external switch.

With respect to a packet from the user, the selecting unit 3 discriminates between bridging and routing, and the packet is inputted to the bridging processor 4 or the routing processor 5. The packet undergone either one of the processes is transmitted to the ISP-A through the ATM terminating unit 6, the IP network 2c, etc.

An ATM cell received over the IP network 2c is disassembled, and transmitted to the personal computers PC1–PC8.

Next, a parallel processing function of the bridging function at Layer 2 and the routing function at Layer 3 (hereinafter referred as layer 2/3 parallel processing function, occasionally) of the DSU 1 will be described in detail with reference to FIG. 3.

Figure 3:
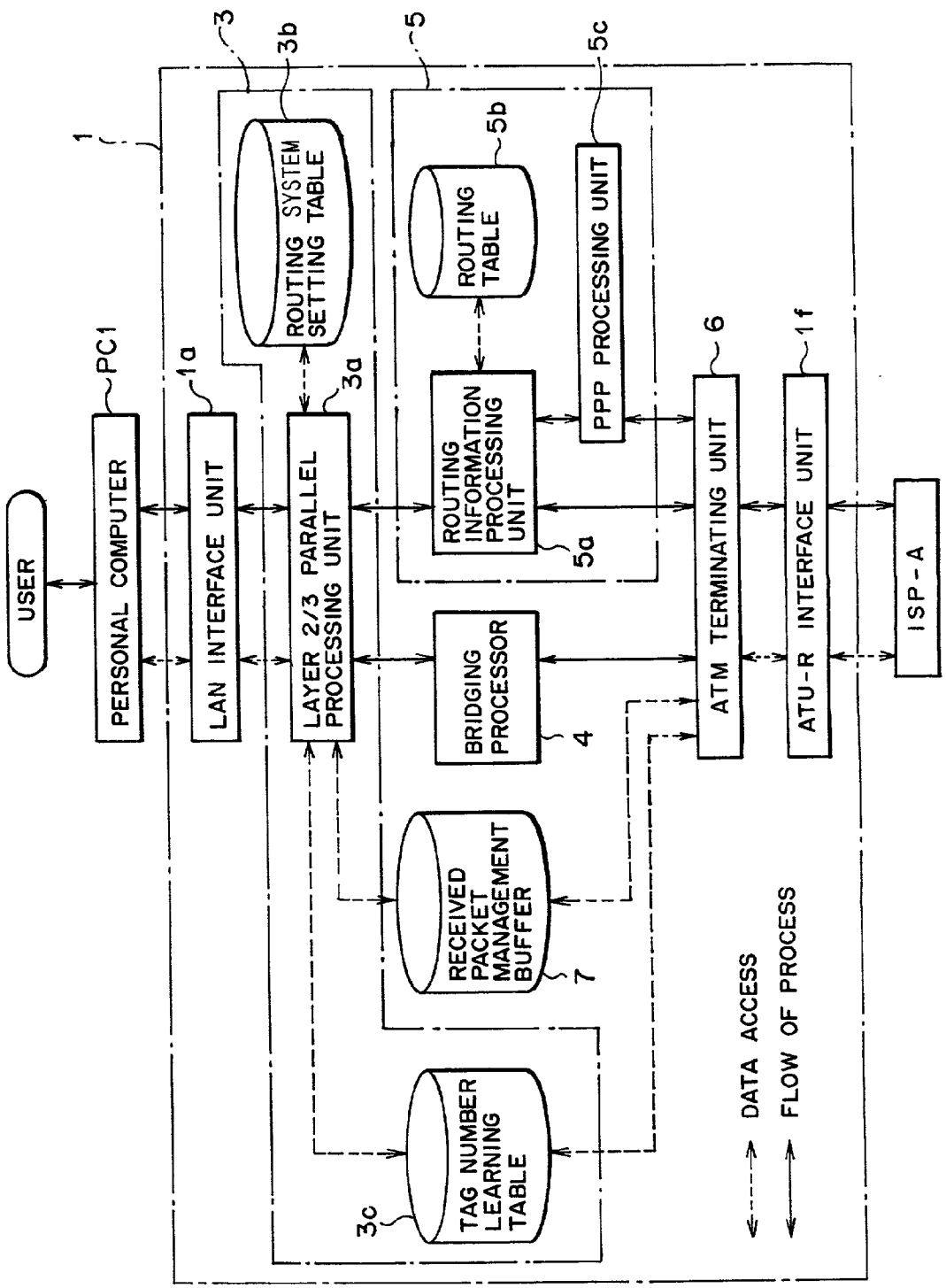
FIG. 3 is a block diagram of the DSU according to the embodiment of the present invention.

FIG. 3 is a block diagram of the DSU 1 according to the embodiment of the present invention. The selecting unit 3 shown in FIG. 3 comprises a layer 2/3 parallel processing unit 3a, a routing system setting table 3b, and a tag number learning table (hereinafter referred as a learning table, occasionally) 3c.

The layer 2/3 parallel processing unit 3a selects a type of distribution representing distribution to either bridging or routing with respect to a packet having a transmission source address. The transmission source address is a MAC address representing a transmission source. Whereby, bridging or routing of the packet is automatically discriminated.

A received packet management buffer (hereinafter referred as management buffer, occasionally) 7 is connected to the layer 2/3 parallel processing unit 3a. The management buffer 7 is a buffer memory temporarily holding data included in a packet received from the user by the DSU 1 and data included in a packet received from the ISP-A. The layer 2/3 parallel processing unit 3a directly replaces the header of the data held in the management buffer 7, or remove the header.

Since a copy of the received packet is not created, a memory area of the management buffer 7 can be saved. Further, a copy of the packet is not moved, the processing speed can be improved.

Incidentally, dash-dotted-lined arrows represent data accesses, whereas solid-lined arrows represent flows of processing. In FIG. 3, like reference characters designate parts having the same or similar functions, further descriptions of which are thus omitted.

The routing system setting table 3b is a table in which either one of bridging or routing process the user desires is registered. The routing system setting table 3b is as shown in FIG. 4, for example.

FIG. 4 is a diagram showing an example of the routing system setting table 3b according to the embodiment of the present invention. The routing system setting table 3b shown in FIG. 4 holds a transmission source IP address, deliverable information about a transmission destination (for example, VC) and a type of distribution representing distribution to either bridging or routing, the transmission source network address, the deliverable information and the type of distribution being related with each other. This function is accomplished by, for example, a memory.

In FIG. 4, transmission source IP address is 192.168.10.252 (hereinafter this inscription represents an IP address) of 32 bits, in concrete. VC is to identify a destination beforehand set to a terminal having 192.168.10.252. VC1 and VC2 represent the ISP-A and ISP-B, respectively. Type of distribution represents a type beforehand set to a terminal having 192.168.10.252.

When extracting 192.168.10.252 from a packet from the user, the layer 2/3 parallel processing unit 3a retrieves in the routing system setting table 3b. the layer 2/3 parallel processing unit thereby finds out that an ISP to which 192.168.10.252 desires to connect is on VC1 (ISP-A), the layer 2/3 parallel processing unit 3a bridges the packet transmitted from 192.168.10.252.

The DSU 1 can automatically discriminate which type of distribution the user desires, as above.

In order to write initial data in the routing system setting table 3b, the user registers data from the setting unit 20d (refer to FIG. 11) of the personal computer PC1.

When discriminating a type of distribution, the layer 2/3 parallel processing unit 3a retrieves a transmission source MAC address of a received Ethernet frame on the basis of a routing table 5b (refer to FIG. 6 or the like) to be described later and a transmission source IP address set in the routing system setting table 3b.

When the layer 2/3 parallel processing unit 3a finds that the setting of distribution by the user is bridging as a result of the retrieval, the layer 2/3 parallel processing unit 3a gives a MAC address to the frame to bridge the same. When the layer 2/3 parallel processing unit 3a finds that the routing function is set in the routing system setting table 3b, the layer 2/3 parallel processing unit 3a routes the frame, and encapsulates IP datagram. After the encapsulation, the layer 2/3 parallel processing unit 3a transmits an ATM cell including the IP packet to a designated VC.

Whereby, the user can simultaneously connect to not only a specific ISP but also a plurality of ISPs, thereby enjoying net surfing as the user pleases without necessity to connect to each one of various ISPs to which the user desires to access.

Further, the user can set a switching between the bridging apparatus and the routing apparatus from a screen of the personal computer without using an external interface, which improves convenience of the operation.

The learning table 3c shown in FIG. 3 relates four kinds of information about the same transmission source MAC address, transmission source IP address and type of distribution, and deliverable information (for example, VC), and manages this relationship with a tag number. The learning table 3c is as shown in FIG. 5, for example.

FIG. 5 is a diagram showing an example of the learning table 3c according to the embodiment of the present invention. The learning table 3c shown in FIG. 5 holds a unique identifier (tag number), a transmission source physical address (transmission source MAC address), a transmission source IP address (transmission source network address), a type of distribution representing distribution to either bridging or routing, and deliverable information on a transmission destination, the unique identifier, the transmission source physical address, the transmission source network address, the type of distribution and the deliverable information being related with each other. This function is accomplished by, for example, a memory disposed inside the DSU 1. The transmission source MAC address is expressed with a hexadecimal number.

The tag number is assigned to one combination of a transmission source MAC address, a transmission source IP address, a type of distribution and a VC. Namely, the tag number signifies a number uniquely given to a relationship represented by this combination. In the DSU 1, each block is processed using a tag number instead of accessing to a packet itself.

In more detail, the tag number is used when there is a relationship in which transmission source MAC address, transmission source IP address and type of distribution are the same but only VC is different. For example, in relationships at tag number 1 and tag number 10, only VCs are different. In such case, the tag number is used to discriminate between them. Further, when data is transmitted to the same VC1, it is possible to change only the type of distribution, and attach a tag number 11, thereby discriminating between them, and holding and managing it separately from the tag number 1.

The layer 2/3 parallel processing unit 3a enables the user to automatically transmit the same packet to a plurality of ISPs. The layer 2/3 parallel processing unit 3a can maintain a throughput for packets of the DSU 1.

The selecting unit 3 (refer to FIG. 3) selects distribution by retrieving the type of distribution held in the routing system setting table 3b on the basis of a transmission source IP address included in a packet. The DSU 1 learns MAC addresses used in communication with the ISP-A to ISP-H using the learning table 3c shown in FIG. 5. A packet whose MAC address is not recorded is not transmitted to a upper layer.

In order to write initial data in the learning table 3c, the user registers data from the setting unit 20d (refer to FIG. 11) of the personal computer PC1.

The learning table 3c holds not only MAC addresses but also a series of arrangement of information, which is tag number 1, tag number 2 and so on, as a tag number table, when learning, so that the DSU 1 learns tag numbers, as well. When personal computers PC1–PC8 under the DSU 1 communicate with each other, a packet in the communication is prevented to be sent to the ISP. It is thereby possible to avoid occurrence of wasteful traffic.

Accordingly, the user does not need to turn an external switch or manually switch the internal setting in order to switch between bridging and routing, or to use an external interface such as RS-232C, which leads to improvement of efficiency of access. The DSU 1 can thereby shorten a processing time to discriminate or relate an IP packet. Further, the DSU 1 can fulfil the bridging function.

In FIG. 3, the routing processor 5 comprises a routing information processing unit 5a, a routing table 5b and a PPP processing unit 5c. The routing information processing unit 5a reads and writes data held in the routing table 5b. The routing table 5b is a table holding information about an appropriate route for transferring a packet, which is as shown in FIG. 6, for example.

FIG. 6 is a diagram showing an example of the routing table 5b according to the embodiment of the present invention. The routing table 5b shown in FIG. 6 holds a transmission destination IP address (destination IP address), a subnetwork mask (subnet mask) and a routing destination port number, the transmission destination network address, the subnetwork mask and the port number being related with each other. This function is accomplished by, for example, a memory. The subnet mask is used to divide a host address of an IP address into a plurality of smaller networks (subnets). The routing destination port number is used to discriminate a port number of the user from a port number of the ATM network 2b. For instance, Ether port shows a destination of a packet transmitted from the DSU 1 to the user. ATM port shows a destination of an ATM cell transmitted from the DSU 1 to the ATM network 2b.

The routing table 5b is initially set by the user, and frequently written with a process of the packet. According to the routing table 5b, a packet reaches a desired destination.

Whereby, "IP over ATM" is realized, so that the user can configure the IP network over the ATM protocol. The user can thus connect to a plurality of desired ISPs over the Internet.

The PPP processing unit (point-to-point processing unit) 5c shown in FIG. 3 outputs a routing packet undergone a protocol process for network connection using a public line. Namely, the PPP processing unit 5c creates a PPP frame to control the point-to-point protocol between the DSU 1 and an ISP. Owing to the PPP processing unit 5c, the user can do setting according to a service mode of the ISP when one DSU 1 sets up a PPP connection. Namely, the user can specify a transmission source address using a transmission source IP address without bridging or routing using the transmission destination IP address.

In FIG. 3, according to a packet processing method of the present invention, a type of distribution representing distribution to either bridging or routing is first set according to a service mode provided by the ISP-A, ISP-B, . . . , or ISP-H connected to the ATM network 2b in the DSU 1 connected to the ATM network 2b (setting step).

Next, the personal computer PC1 signing up for the DSU 1 transmits packets including a transmission source IP address to each of the ISP-A to ISP-H (transmitting step). The transmission source IP address included in each of the packets transmitted at the transmitting step is specified (address specifying step). For each of the packets specified at the address specifying step, a type of distribution is selected (selecting step).

On the basis of a type of distribution selected at the selecting step, each of the packets is processed (processing step).

Either one of the bridging function or the routing function the user expects is beforehand set to the DSU 1, whereby a packet is automatically discriminated.

At the time of the above process (processing step), a VC relating to a transmission destination is processed (managed) with a tag number. Additionally, at the processing step, the learning table 3c relating a tag number, a transmission source MAC address, a transmission source IP address, a VC relating to a transmission destination, and a type of distribution representing distribution to either bridging or routing, and holding them is used, whereby the tag number is learned (learning step).

On the basis of the tag numbers learned at the learning step, the packets are transmitted to the ISP-A to ISP-H (transmitting step).

As above, the user can carries out the Layer 2 processing and the Layer 3 processing in parallel without replacing the DSU 1 itself or turning the switch aware of a connection system differing from ISP to ISP.

Next, detailed description will be made of a flow of data processing in the upstream and downstream in the layer 2/3 parallel processing unit 3a in the packet processing method according to the embodiment of the present invention configured as above, with reference to FIGS. 1, 7 to 9, 13 and 14.

In the packet processing method according to the present invention, in the upstream, a type of distribution representing distribution to either bridging or routing is extracted with respect to a packet having a transmission source IP address (extracting step).

A type of distribution extracted at the extracting step is selected on the basis of the learning table 3c relating a tag number, a transmission source MAC address, a transmission source IP address, a VC relating to a transmission destination and a type of distribution representing distribution to either bridging or routing, and holding them (selecting step).

According to a type of distribution selected at the selecting step, the packet is encapsulated into an ATM cell given a VC included in the learning table 3c to generate an encapsulating cell (encapsulating step).

It is therefore possible to increase the number of destinations to which data can be transmitted, and accommodate a number of subscribers.

Next, description will be made of the packet processing method with reference to FIG. 7.

FIG. 7 is a diagram for illustrating a data processing flow according to the embodiment of the present invention. FIG. 7 shows a flow of processing denoted by (1) to (6).

When the DSU 1 receives IP datagram (indicated as LAN packet) transmitted in the upstream, the LAN interface unit 1a removes a preamble in the head of the packet, and transfers a part after the Ethernet header to the layer 2/3 parallel processing unit 3a. The layer 2/3 parallel processing unit 3a reads the packet to examine (check) whether the packet has been already registered on the learning table 3c or not.

When the packet has not been registered, the layer 2/3 parallel processing unit 3a retrieves a transmission source IP address in the routing system setting table 3b beforehand set by the user, as denoted by (1) in FIG. 7.

When a transmission source IP address of the packet is hit, the layer 2/3 parallel processing unit 3a takes out a transmission source MAC address from the hit IP datagram, and writes the transmission source MAC address taken out in the learning table 3c, as denoted by (2).

Simultaneously with (2), the layer 2/3 parallel processing unit 3a reads information (transmission source IP address, VC, type of distribution) written in the routing system setting table 3b, and writes it in the routing system setting table 3b, as denoted by (3).

The layer 2/3 parallel processing unit 3a sets a tag number (0–256) in the completed learning table 3c. When the layer 2/3 parallel processing unit 3a receives a packet to which the same tag number as the set tag number is given after that, the layer 2/3 parallel processing unit 3a gives the tag number to the head of the received IP datagram, and holds it in the management buffer 7 to manage it.

The layer 2/3 parallel processing unit 3a gives a tag number held in the learning table 3c to the head of the received packet to create IP datagram 10b to which the tag number is given, as denoted by (4).

Following that, the layer 2/3 parallel processing unit 3a saves the IP datagram 10b in the management buffer 7, as denoted by (5).

The layer 2/3 parallel processing unit 3a converts the IP datagram 10b saved in the management buffer into an ATM cell in the ATM terminating unit 6 according to a result of the processing, as denoted by (6).

When the DSU 1 receives a packet from the user after writing the packet in the management buffer 7, the layer 2/3 parallel processing unit 3a does not copy or move the received packet. But, the layer 2/3 parallel processing unit 3a retrieves in the learning table 3c to check whether the tag number has been already learned. When the tag number has not been learned, the layer 2/3 parallel processing unit 3a makes the learning table 3c learn the tag number, and charges the routing processor 4 or the routing processor 5 to process it.

The layer 2/3 parallel processing unit 3a does not directly convert the received packet in the encapsulating process after the learning, but processes all packets using tag numbers, retrieves a received packet on the basis of a tag number when encapsulating it, and edits the packet. Then, the layer 2/3 parallel processing unit 3a gives a VC in the learning table 3c to an ATM header before the edited packet is handed to the ATM terminating unit 6, and transfers it.

In FIG. 1, an ATM cell given a VC thereto is transmitted to the ATM network 2b, the VC is read by the ATM router, and the ATM cell is delivered. The ATM cell is received by the ATM cell transmitting/receiving unit 32 of, for example, the ISP-A over the ATM network 2b, and the ATM cell is disassembled by the ATM processing unit 30b of the authentication server 31. Further, IP datagram of the disassembled ATM cell is authenticated by the PPP authenticating unit 30c. When the authentication is successful, the IP datagram is transmitted to the IP network 2c.

Since the DSU 1 can immediately limit a relationship between a transmission source address and a VC using the learning table 3c, the DSU 1 can deliver data while discriminating which VC each of the personal computers PC1–PC8 under the DSU 1 is connected to. Whereby, it becomes possible to communicate using simultaneously, for example, eight lines.

In the downstream, on the basis of a VP or a VC included in a header of a received ATM cell, the learning table 3c is referred, and corresponding bridging process or routing process is carried out.

A flow of the data processing in the downstream is approximately reversal to the data processing in the upstream. Namely, in the packet processing method of the present invention, IP datagram, a frame and a VC included in an ATM cell encapsulated into an ATM cell having a VC and a VP are outputted in the DSU 1 connected to the ATM network 2b (terminating step).

Next, the learning table 3c relating a tag number, a transmission source physical address, a transmission source IP address, a type of distribution representing distribution to either bridging or routing and the first VC relating to a transmission destination is referred (learning table referring step).

On the basis of the VC included in the packet outputted at the terminating step and the VC held in the learning table 3c referred at the learning table referring step, the packet is transmitted to a terminal such as the personal computer PC1, PC2, . . . or PC8 signing up for the DSU 1 (transmitting step).

Each block of the DSU 1 does not access to a packet itself but processes using a tag number held in the learning table 3c, whereby every distribution is automated.

FIG. 13 is a diagram for illustrating a sequence in the bridging process according to the embodiment of the present invention. FIG. 13 shows messages W1 and W2, and a link W3 between the personal computer PC1 and the ISP-A.

Incidentally, each of the personal computers PC2–PC8 performs the similar process, and each of the ISP-B to ISP-H performs the similar process. In FIGS. 13 and 14 to be described later, like reference characters designate parts having the same or similar functions, further descriptions of which are thus omitted.

If the user uses the DSU 1 as a bridging apparatus when receiving the Internet connecting service, the user transmits an Ethernet frame to the DSU 1. When receiving the frame, the DSU 1 retrieves a transmission source MAC address in the frame. When the type of distribution is bridging, the DSU 1 gives a transmission source MAC address to the frame to bridge the same. When the type of distribution is routing, the DSU 1 routes the frame, generates an ATM cell, gives a VC corresponding to an IP address to which the user desires to connect, and transmits the ATM cell to the ATM network 2b.

The personal computer PC1 shown in FIG. 13 transmits an authentication request (message W1) including an ID (Identification) and a password of the user to the authentication server 31. The authentication server 31 authenticates the personal computer PC1 using the received ID and password, and transmits a result of the authentication (message W2) of whether the authentication is successful (OK) or failed (NG: No Good) to the personal computer PC1. When the result of the authentication is successful, a packet communication at Layer 2 is started between the personal computer PC1 and the authentication server 31 (link W3).

FIG. 14 is a diagram for illustrating a sequence in the routing process according to the embodiment of the present invention, which shows messages W11 to W13 and a link W14 among the personal computer PC1, the DSU 1 and the ISP-A. Incidentally, each of the personal computers PC2–PC8 performs the similar process to the personal computer PC1, and the authentication server 31 of each of the ISP-B to ISP-H performs the similar process to the ISP-A.

The personal computer PC1 transmits a connect request (message W11) to the DSU 1. The DSU 1 transmits an authentication request (message W12) including the ID and password to the authentication server 31. The authentication server 31 transmits a result of authentication (message W13) showing success or failure of the authentication to the DSU 1. When the result of the authentication is successful, IP packet communication at Layer 3 is started between the personal computer PC1 and the authentication server 31 (link W14).

As above, the DSU 1 can exhibit both the bridging and routing functions using the routing system setting table 3b provided in the DSU 1.

According to this ATM cell transmission system 50, a plurality of users can simultaneously connect to a maximum of 65535 ISPs in the ATM cell transmission system 50. Further, since each of packets is automatically distributed according to a service mode relating to a connection of an ISP inside the DSU 1, it is possible to automatically accomplish both the routing and bridging functions.

Therefore, the user can cope with different service modes in the ATM network 2b.

(B) Others

The present invention is not limited to the above examples, but may be modified in various ways without departing from the scope of the invention.

The above bridging and routing can be applied to an upper layer. Each layer has a service and an entity as well known. Consequently, the first layer may be, for example, Layer 6, and the second layer may be, for example, Layer 7. Further, the first distributing process and the second distributing process may execute services at Layer 6 and Layer 7, respectively.

In managing ATM cells, for example, it is possible to use not only VC but also VP, or both VC and VP.

As the above tag number, a sign to discriminate tag information from another may be used.

The invention claimed is:

1. A subscriber terminating apparatus comprising:
    a selecting unit for selecting a type of distribution, which represents distribution to either bridging or routing, for a packet having at least a transmission source address, based on only the transmission source address of the packet;
    a bridging processor for bridging the packet to generate a bridging packet when said selecting unit has selected the type of distribution representing distribution to bridging;
    a routing processor for routing the packet to generate a routing packet when said selecting unit has selected the type of distribution representing distribution to routing; and
    a terminating unit for encapsulating either the bridging packet or the routing packet using a predetermined cell to generate an encapsulating cell.

2. The subscriber terminating apparatus according to claim 1, wherein
    said selecting unit including a routing system setting table for holding a transmission source network address, delivery information about a transmission destination and the type of distribution, and
    the transmission source network address, the delivery information and the type of distribution are related with each other.

3. The subscriber terminating apparatus according to claim 1, wherein
    said selecting unit including a learning table for holding, at least, a unique identifier, a transmission source physical address, a transmission source network address, the type of distribution, and delivery information about a transmission destination, and
    the unique identifier, the transmission source physical address, the transmission source network address, the type of distribution, and the delivery information are related with each other.

4. The subscriber terminating apparats according to claim 2, wherein
said selecting unit including the learning table for holding, at least, a unique identifier, a transmission source physical address, the transmission source network address, the type of distribution, and the delivery information about a transmission destination, and
the unique identifier, the transmission source physical address, the transmission source network address, the type of distribution, and the delivery information are related with each other.

5. The subscriber terminating apparatus according to claim 2, wherein
said selecting unit selects the type of distribution by consulting said routing system serving table, based on only the transmission source network address included in the packet.

6. The subscriber terminating apparatus according to claim 3, wherein
said selecting unit selects said the type of distribution by consulting said routing system setting table, based on only the transmission source network address included in the packet.

7. The subscriber terminating apparatus according to claim 4, wherein
said selecting unit selects the type of distribution by consulting said routing system setting table, based on only the transmission source network address included in the packet.

8. The subscriber terminating apparatus according to claim 1, wherein
said routing processor including a routing table for holding, at least, a transmission destination network address, a subnetwork mask and a port number to be routed, and
the transmission destination network address, the subnetwork mask and the port number are related with each other.

9. The subscriber terminating apparatus according to claim 8, wherein
said routing processor including a point-to-point processing unit for outputting a routing packet which has undergone a protocol processing for a network connection using a public line.

10. The subscriber terminating apparatus according to claim 1, wherein
said terminating unit uses an asynchronous transfer mode cell as the predetermined cell.

11. The subscriber terminating apparatus according to claim 10, wherein
said terminating unit assigns at least either a virtual channel or a virtual path as the delivery information.

12. A subscriber terminating apparatus comprising:
a selecting unit for selecting a type of distribution, which represents distribution to either a first distributing process at a first layer or a second distributing process at a second layer for a packet having at least a transmission source address, based on only the transmission source address of the packet;
a first distributing processor, responsive to the selection of the first distributing process by said selecting unit, for performing the first distributing process on the packet to generate a first packet, which has undergone the first distributing process;
a second distributing processor, responsive to the selection of the second distributing process by said selecting unit, for performing the second distributing process on the packet to generate a second packet, which has undergone the second distributing process; and
a terminating unit for encapsulating either the first packet or the second packet using a predetermined cell to generate an encapsulating cell.

13. A subscriber terminating apparatus comprising:
a learning table for holding at least a unique identifier, a transmission source physical address, a transmission source network address, a type of distribution, which represents distribution to either bridging or routing, and first delivery information about a transmission destination, wherein
the unique identifier, the transmission source physical address, the transmission source network address, the type of distribution, and the first delivery information are related with each other;
a terminating unit for extracting second delivery information about a transmission destination from a predetermined cell having at least the second delivery information, and outputting a packet based on the second delivery information and the first delivery information held in said learning table;
a bridging processor for bridging the packet outputted from said terminating unit;
a routing processor for routing the packet outputted from said terminating unit; and
a selecting unit for selectively outputting either the packet bridged at said bridging processor or the packet routed at said routing processor, based on only the transmission source network address held in said learning table.

14. A packet processing method comprising:
a setting step of setting a type of distribution, which represents distribution to either bridging or routing, in a subscriber terminating apparatus connected to a network, according to a service provided by each of a plurality of providers;
a transmitting step of transmitting a plurality of packets, each of which includes a transmission source network address, from a terminal, which is connected to the subscriber terminating apparatus, to the plural providers respectively;
an address specifying step of specifying the transmission source network address included in each of the plural packets transmitted in said transmitting step;
a selecting step of selecting the type of distribution for each said packet specified in said address specifying step, based on only the transmission source network address of each said packet; and
a processing step of processing each said packet based on the type of distribution selected in said selecting step.

15. The packet processing method according to claim 14, wherein
said processing step processes delivery information about a transmission destination using a unique identifier associated with the delivery information.

16. The packet processing method according to claim 15, wherein said processing step comprising:
learning the unique identifier using a learning table, which holds at least the unique identifier, a transmission source physical address, the transmission source network address, the type of distribution which represents distribution to either bridging or routing, and the delivery information about a transmission destination, wherein
the unique identifier, the transmission source physical address, the transmission source network address, the type of distribution, and the delivery information are related with each other; and transmitting the packets to the plural providers based on the unique identifiers learned in said learning step.

17. A packet processing method comprising:

an extracting step of extracting a type of distribution, which represents distribution to either bridging or routing, for a packet having at least a transmission source address;

a selecting step of selecting the type of distribution extracted in said extracting step based on a learning table, which holds only a unique identifier, a transmission source physical address, a transmission source network address, the type of distribution, and delivery information about a transmission destination, wherein the unique identifier, the transmission source physical address, the transmission source network address, the type of distribution, and the delivery information are related with each other; and an encapsulating step of encapsulating the packet using a predetermined cell, to which the delivery information included in the learning table is added according to the type of distribution selected in said selecting step, to generate an encapsulating cell.

18. A packet processing method comprising:

an outputting step of outputting a packet encapsulated in a predetermined cell, which packet has at least either a virtual channel or a virtual path, and also outputting at least either the virtual channel or the virtual path in a subscriber terminating apparatus connected to a network;

a learning table referring step of referring to a learning table, which holds only a unique identifier, a transmission source physical address, a transmission source network address, a type of distribution, which represents distribution to either bridging or routing, and first delivery information about a transmission destination, wherein the unique identifier, the transmission source physical address, the transmission source network address, the type of distribution, and the delivery information are related with each other; and a transmitting step of transmitting the packet to a terminal, which is connected to the subscriber terminating apparatus, based on either the virtual channel or the virtual path included in the packet outputted in said terminating step, and also based on either the virtual channel or the virtual path held in the learning table referred in said learning table referring step.

* * * * *